(12) United States Patent
Reed et al.

(10) Patent No.: US 6,640,087 B2
(45) Date of Patent: Oct. 28, 2003

(54) METHOD AND APPARATUS FOR INCREASING SERVICE EFFICACY IN AN AD-HOC MESH NETWORK

(75) Inventors: John Douglas Reed, Arlington, TX (US); Jack Anthony Smith, Bedford, TX (US)

(73) Assignee: Motorola, Inc., Schaumburg, IL (US)

(*) Notice: Subject to any disclaimer, the term of this patent is extended or adjusted under 35 U.S.C. 154(b) by 2 days.

(21) Appl. No.: 10/020,328

(22) Filed: Dec. 12, 2001

(65) Prior Publication Data

US 2003/0109285 A1 Jun. 12, 2003

(51) Int. Cl.$^7$ .............. H04B 7/15; H04B 1/36; H04B 7/00; H04Q 7/20
(52) U.S. Cl. ............. 455/11.1; 455/562; 455/500; 455/445; 370/338; 370/351
(58) Field of Search .............. 455/422, 500, 455/425, 428, 502, 63, 65, 67.1, 67.3, 445, 11.1, 562; 370/389, 336, 338, 347, 254, 330, 351, 337, 339, 328, 329, 345

(56) References Cited

U.S. PATENT DOCUMENTS

| | | | |
|---|---|---|---|
| 5,987,011 A | * 11/1999 | Toh | 370/331 |
| 6,161,023 A | 12/2000 | Johnson et al. | 455/562 |
| 6,307,843 B1 | * 10/2001 | Okanoue | 370/312 |
| 6,490,459 B1 | * 12/2002 | Sugaya et al. | 455/517 |
| 6,493,545 B1 | * 12/2002 | Sugaya | 455/272 |
| 2002/0176396 A1 | * 11/2002 | Hammel et al. | 370/347 |
| 2002/0187783 A1 | * 12/2002 | Sugaya | 455/435 |
| 2002/0196844 A1 | * 12/2002 | Rafie et al. | 375/232 |

* cited by examiner

Primary Examiner—Nay Maung
Assistant Examiner—Edan Orgad
(74) Attorney, Agent, or Firm—Posz & Bethards, PLC; Charles W. Bethards

(57) ABSTRACT

A method of and wireless communications unit (WCU) for providing service in a mesh network includes a receiver for receiving a first signal from a first WCU in the mesh network; a directional antenna system for coupling the signal to the receiver, the signal arriving from a first selected one of a first plurality of directions; a controller to control the directional antenna system such that the signal is coupled to the receiver according too a local predetermined pattern of the first plurality of directions; and a transmitter to send a second signal in a second selected one of the first plurality of directions, where the controller interrupts the local predetermined pattern and selects the second direction.

29 Claims, 4 Drawing Sheets

METHOD AND APPARATUS FOR INCREASING SERVICE EFFICACY IN AN AD-HOC MESH NETWORK

FIELD OF THE INVENTION

This invention relates in general to communication systems, and more specifically to a system, method, and apparatus for increasing service efficacy in an ad-hoc wireless mesh communications network.

BACKGROUND OF THE INVENTION

The traditional approach used for terrestrial wireless communication networks such as cellular networks consists of dividing the desired coverage area into a set of overlapping regions, where all of the subscribers within each region are served from a single transceiver known as a base station using a point-to-multipoint (PMP) or one-to-many approach. One of the problems with a PMP architecture is that it becomes more difficult to establish links directly between a given subscriber radio and the base station as the transmission carrier frequency increases, which poses a problem for future wireless networks since they are increasingly being deployed at higher carrier frequencies.

Other problems include the economic burdens associated with deploying a system since large costs are incurred while deploying the network infrastructure before any revenue can be raised to offset those expenses. Additionally there are extensive problems of coordination and planning and expense associated with expanding such systems. To avoid or address these problems to one extent or another, a new type of network architecture known as "mesh" architecture is being explored. Some systems are being proposed and deployed for providing relatively broadband packet data services to residential customers.

In the mesh architecture 100 such as depicted in FIG. 1 a multiplicity of communications units, A-G 101–113 are deployed, normally one or more per household or business and operate in an ad-hoc peer to peer fashion to establish links where possible and as required among each of a given units neighbors. For example unit A can establish links or paths 117, 119, 121 with, respectively units E, D, and B since as is typical the units employ an omni-directional antenna. Some units can employ a directional antenna 123 such as unit E and this limits there ability to see (establish links with) units that are not in the direction of their antenna while enhancing there ability to see more distant units that are in the direction of there antenna.

Each or many of the communications units have the ability to relay communications signals from an originating communications unit to a target unit when these communications units are not able to create a direct communication link or path from one to the other unit. Information that is being communicated may be relayed or handed from communications unit to communications unit until it reaches the intended destination or target unit. For example, if unit E wanted to communicate with unit F 111 or the wired network 115, information from unit E would be relayed by unit D to unit F or on to the wired network. Note: that if the direct link from unit D to F were interrupted by a tree growing or new house being constructed, the inherent redundancy in the mesh architecture allows routing the information from unit D through unit C or unit G. In this fashion the infrastructure or backbone that is represented by the traditional base stations and supporting equipment is in a sense deployed as the system gains customers and begins to realize revenue.

However the mesh architecture or system can also experience problems as the density of the communications units increases. A typical way of initiating communication between communications units begins with the transmission of a "Request-to-send" (RTS) packet by the initiating unit. This packet is typically received by all units within the transmission range of, or that can see, the initiating unit. The RTS packet notifies these units that the initiating unit would like to establish a communication link with a target unit whose identity is specified within the packet contents.

Upon successfully receiving this RTS packet, the target unit will respond with a "Clear-to-send" (CTS) packet that notifies the initiating radio that the target unit is ready to begin receiving transmissions from the initiating unit. The CTS packet also serves notice to the rest of the units in the area that the transmission medium has been reserved so that they can refrain from simultaneous transmissions that might interfere with the prearranged transmissions. Note that any relaying units and there neighbors will also be notified and will need to refrain from simultaneous communications. Because all other units in the area of the target unit, originating unit, and relaying units, if any, are forced to remain idle during the subsequent communications between the initiating and target units, system throughput can be severely diminished. Any desired transmissions by the idled units are delayed which can negatively effect overall user satisfaction.

As the number or density of communications units grows this problem must be addressed. Using directional antennas to limit the number of units that are interfered with or idled can help but that also creates problems. For example, if a unit wishes to communicate with another unit that is using a directional antenna this will not be possible unless or until the antenna is pointing in the direction of the unit. Furthermore this will waste time for the originating unit and other units while RTS packets are being sent to a unit that has no chance of hearing them. Additionally, transmission of RTS packets that have no chance of being heard unnecessarily ties up the transmission channel and increase interference, thus further negatively impacting performance. Obviously better methods and apparatus are needed.

BRIEF DESCRIPTION OF THE DRAWINGS

The accompanying figures, where like reference numerals refer to identical or functionally similar elements throughout the separate views and which are incorporated in and form part of the specification, serve to further illustrate various embodiments in accordance with the present invention. The figures together with the detailed description, hereinafter below, serve to explain various principles and advantages in accordance with the present invention.

DETAILED DESCRIPTION OF PREFERRED EMBODIMENT

Figure 1:
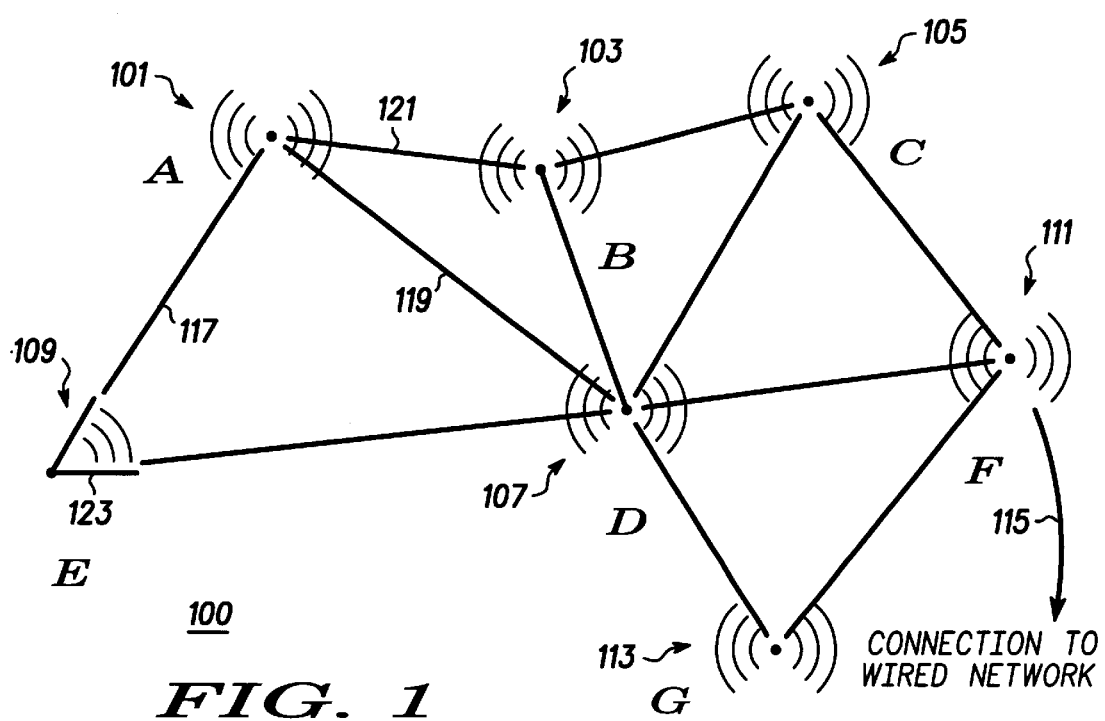
FIG. 1 depicts, a simplified block diagram of a prior art mesh communications system.

In overview form the present disclosure concerns communications systems that provide service to communications units or more specifically user thereof operating therein. More particularly various inventive concepts and principles embodied in methods and apparatus for improving service availability in a mesh communications system or network for users are discussed. The communications systems of particular interest are those being deployed and developed, commonly referred to as mesh networks, that operate in an ad-hoc manner to form links amongst peers and thus collectively a network. Such systems typically operate in the 2–40 GHz range and often under ISM frequency allocations and rules. Normally they are best suited for wireless packet data communications systems and may be expected to employ IP addressing techniques including IPv6. To-date mobility within such systems is limited to relatively small ranges.

As further discussed below various inventive principles and combinations thereof are advantageously employed that use predetermined patterns for directional antenna tuning or scanning thus limiting the number of neighbor communications units or peer units that will be impacted by communications from a given unit. This will alleviate various problems associated with known systems while still facilitating setting up sessions or links with or between groups of units or users provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 2:
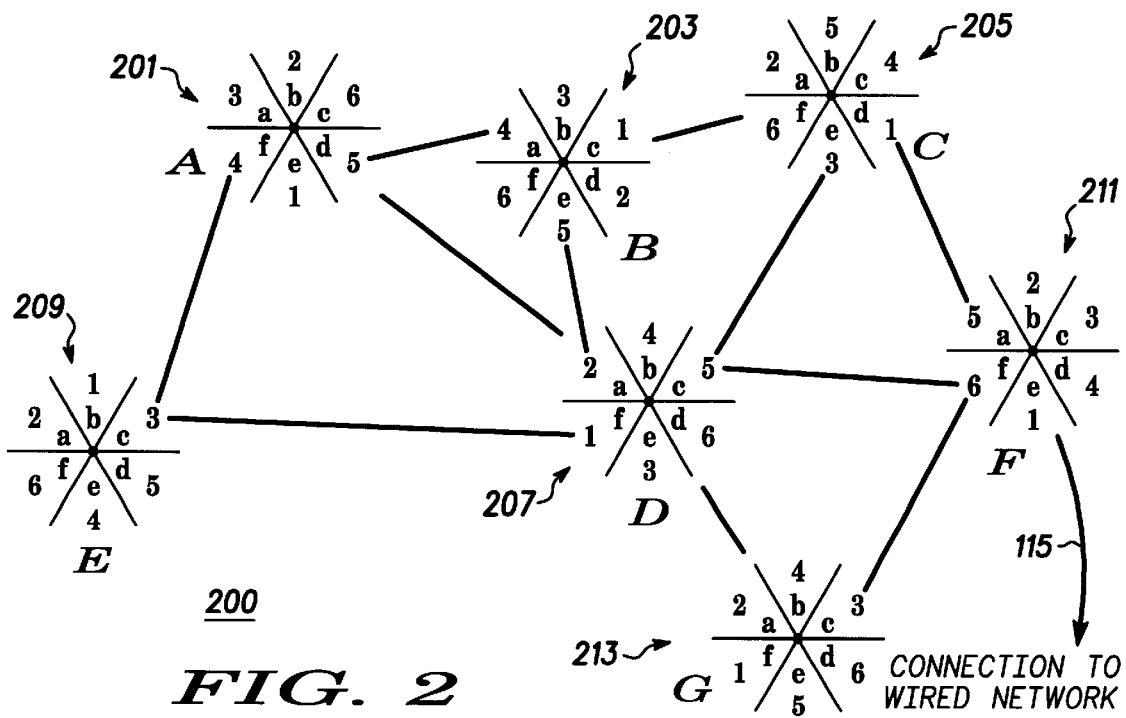
FIG. 2 depicts, in a simplified and representative form, one preferred embodiment of a mesh communications system according to the present invention.

FIG. 2 depicts, in a simplified and representative form, one preferred embodiment of a mesh communications system 200 according to the present invention. It is expected that a discussion of FIG. 2 will help provide some common language as well as familiarize the reader with some of the problems of present systems and some of the opportunities envisioned by the principles and concepts according to the present invention. Included in the system 200 is a multiplicity of wireless communications units (WCUs) A-G, 201–213. These units are at the same time subscriber units and peer units and would be expected to be deployed one or more per household or business location. Unit F is shown coupled to a wired network such as the PSTN or Internet at 115. This network can use code division, time division, or frequency division multiple access technologies but will be described herein in terms of a time division duplex system. The system can use one or more known modulation techniques and protocols for the various stack levels. For example 802.11a is a time division duplex (TDD) system that specifies Orthogonal Frequency Division Multiplexing ((OFDM) with multi-level modulation and coding to achieve data rates that may be selected based on the signal to noise ratio of the channel.

Figure 5:
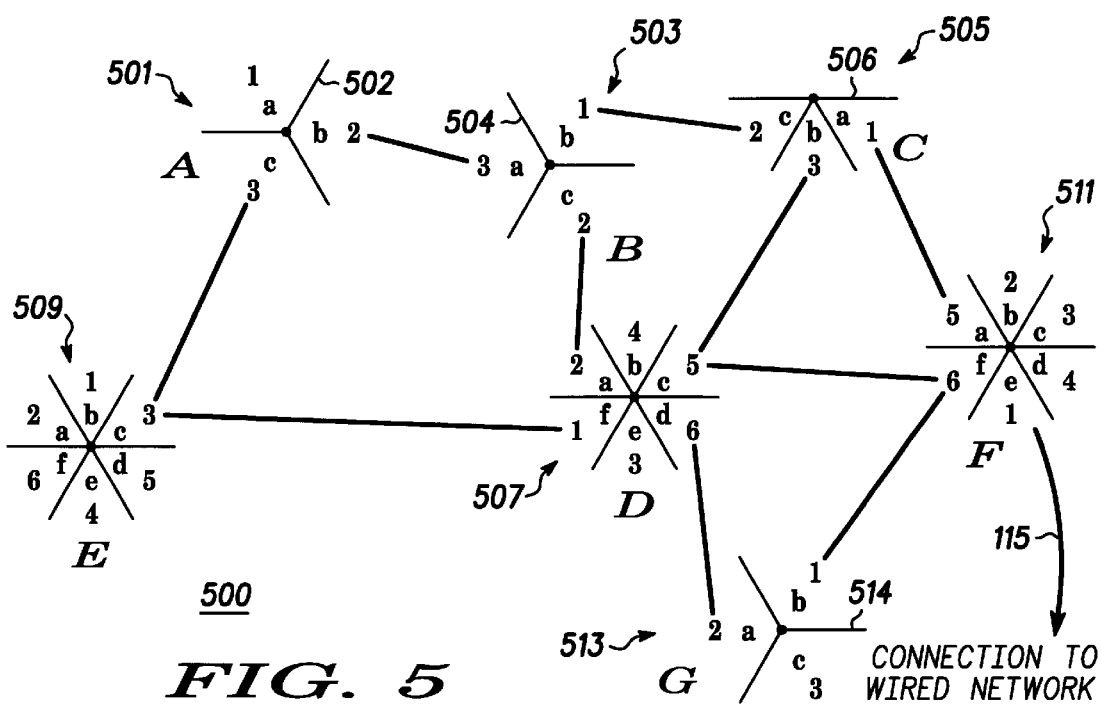
FIG. 5 depicts in a simplified and representative form, another embodiment of a mesh communications system according to the present invention.

Each of the WCUs is shown with a directional antenna system and more specifically a six-sector antenna system including sectors a–f as depicted. Although each unit is shown with the same antenna this is not essential to take advantage of the principles and concepts of the present discussions. This will be discussed at greater length when FIG. 5 is reviewed below. Each unit can see or is within communications range of a number of other units and can form links or communications paths or channels, as depicted, with those other units. Each or many of the WCUs can also relay information or signals from an originating WCU to a target WCU and often times there will be many such relays to complete a connection between the two. This redundancy, the ad-hoc nature of these links and the formation of them, and the relay capabilities are some of the attractions of mesh networks.

FIG. 2 also shows numbers at each of the sectors a–f of each antenna. These numbers represent a time slot when that sector for that subscriber unit or device is actively receiving from that antenna element or generally from the direction that element is pointing. Collectively they represent a pattern, preferably a local predetermined pattern that the antenna systems scan or rotate through. Focusing on WCU B we can observe that during time slots 1–6 sector c, d, b, a, e, and f are, respectively, active. Similar observations can be made for the other WCUs. Generally these are predetermined patterns when the respective receivers will usually be active. Thus if WCU A 201 wishes to send an RTS packet to WCU B it will need to know the predetermined pattern for the target unit B and deviate from its local pattern. Specifically during time slot 4 WCU A would want to activate its directional antenna sector d and transmit the RTS packet to maximize the chances of contacting WCU B.

Figure 3:
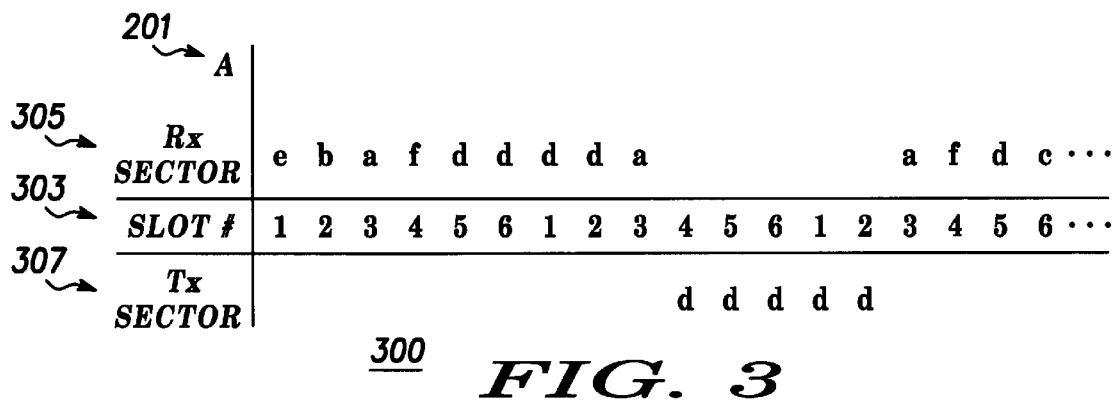
FIG. 3 shows a predetermined pattern for antenna directions that may be employed in the system of FIG. 2.

As one more example, suppose WCU B as an originating WCU wants to send or transmit a signal or message or series of packets to a target WCU, specifically, WCU A. Referring to FIG. 3, an exemplary predetermined pattern 300 for antenna directions or antenna sector activations that would be employed in the system of FIG. 2, specifically at WCU A 201 is shown. FIG. 3 shows time slot numbers 303, receive sectors 305 that are active when WCU A is receiving, and transmit sectors 307 that are active when WCU A is transmitting. From above we know that WCU B will want to transmit the message over its antenna sector during time slot 5 to maximize its chances of contacting WCU A. Thus WCU A runs through its predetermined pattern looking for activity on sectors e, b, a, f, and d for, respectively, time slots 1–5 and detects the message during time slot 5 on sector d. Thereafter the unit keeps its antenna sector d active for slots 5, 6, 1, and 2.

This serves to demonstrate another concept and that is a deviation from the normal predetermined pattern for the duration of a message or time to receive the message.

Thereafter WCU A returns to its normal pattern and in slot 3 activates sector a. In this instance the message received from WCU B requires a response. Thus WCU A in time slot 4 activates sector d to maximize its chances of connecting with WCU B for the response and remains there for time slots 4, 5, 6, 1, and 2. Presumably the response required 5 time slots to complete. WCU A resumes its normal pattern thereafter for slots 3–6 etc. Often in practice WCU A will provide the response immediately after receiving the message from WCU B without either WCU having resumed there normal predetermined patterns. Note that the signal from WCU B may have been relayed from another WCU such as WCU C. There are countless ways to organize the particular slots and the specific organization will be system specific. For example, there can be additional slots available within the sequence that are not used in the pattern for scanning but rather assigned to support data transmissions between specific WCUs. Some or all of these additional slots or time periods may be reassigned to other pairs of WCUs as needed to support data transmissions between those nodes. One further point is the units will have to be synchronized to the time slots. There are known ways of doing this. Perhaps the most straight forward is using a GPS signal and receiver at each unit.

Figure 4:
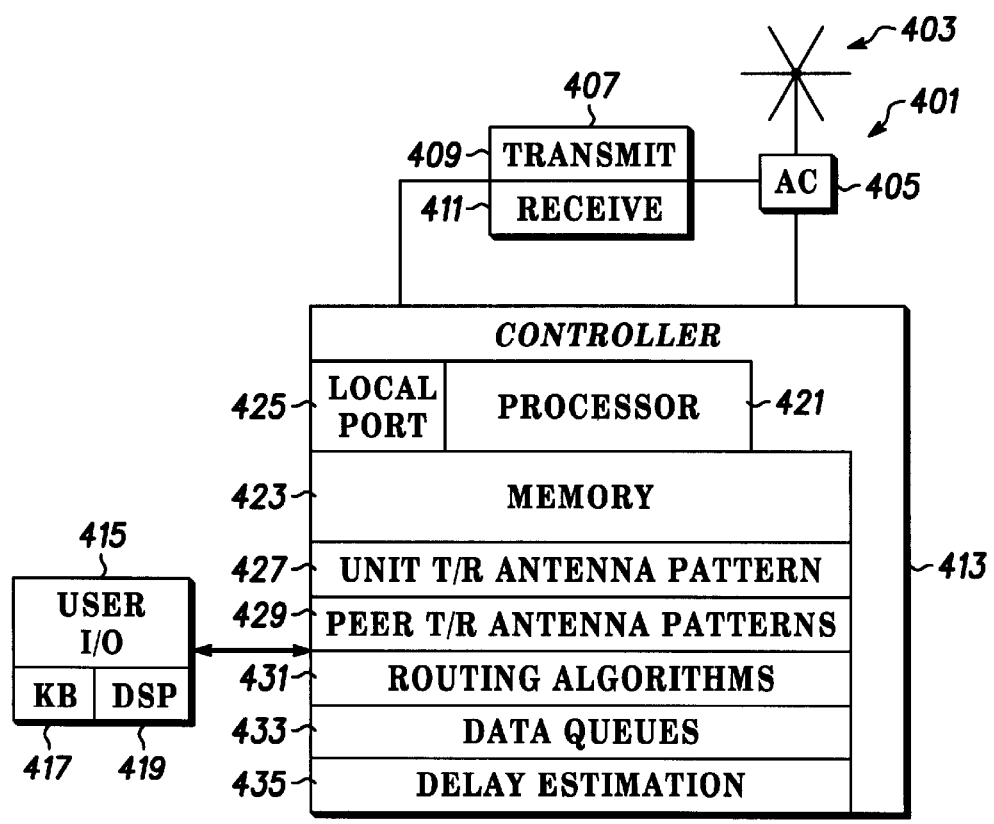
FIG. 4 illustrates in block diagram form, a preferred embodiment of a wireless communications unit in accordance with the present invention.

FIG. 4 illustrates in block diagram form, a preferred embodiment of a wireless communications unit (WCU) 400 in accordance with the present invention. The WCU 400 would be suitable for any of the WCUs or subscriber units in FIG. 2, namely A-G 201–213. The wireless communications unit (WCU) is arranged and constructed to provide service in a mesh network such as the network 200 of FIG. 2. The WCU includes a directional antenna system 401 that includes an antenna structure 403, preferably, an antenna having a plurality of sectors such as 6 sectors as depicted or 2, 3, etc. sectors as desired, and an antenna controller 405 that is arranged to allow for selection of one or more of the sectors, thus directions, for a time period. These sectors determine a direction to which the antenna is pointing or tuned to and this direction can include both a heading and elevation parameters, coordinates, or components. Note the directional antenna system could as well be a steered or steer-able beam antenna system with the appropriate antenna structures and antenna controllers. These directional antenna systems use known structures and controller approaches that provide the advantages described here when controlled and utilized according to the inventive principles and concepts described in the present disclosure.

Further included in the WCU 400 is a transceiver 407 that is coupled to the directional antenna system. The transceiver includes a receiver 411 for receiving signals from and a transmitter 409 for transmitting or sending signals, coupled from or to the directional antenna system, to other WCUs in the network. The transceiver includes known radio frequency technologies. The transceiver and directional antenna system are coupled to a controller 413 and the controller is, preferably, coupled to a user input output function (I/O) 415 that, preferably, includes a conventional keyboard 417 or keys and a display 419. The user I/O allows for a user to interact with the WCU as needed.

The controller 413 includes a processor 421, preferably a microprocessor that is widely available from manufacturers such as Intel and Motorola, that is coupled to a local port 425 and a memory 423. The local port is often a known 10/100 base T port or equivalent that will typically interface to a local area network (LAN) such as found in a household or small business establishment. GPS signals and time bases can be made available through this port if a GPS receiver (not shown) is not included in the WCU. This interface will allow and provide for connectivity from users of that LAN via the mesh network to other users and resources. The memory is, preferably, comprised of a combination of RAM, PROM, and possibly magnetic memory all as is known. The memory 423 includes software instructions and parameters that when executed and utilized by the processor causes the controller to control the transceiver and directional antenna system to send and receive signals from other WCUs in accordance with the protocols and other operational conventions that will depend on the particular mesh network. More particularly the memory includes one or more antenna patterns or local antenna patterns 427 for the WCU or unit's transmitter and receiver. In addition the memory includes one or more peer or target unit predetermined antenna patterns 429 and likely one or more for each peer, neighbor, or target unit's transmitter and receiver that can be seen or reached with the unit 400 transceiver. Additionally included are routing algorithms 431 that are known or being developed algorithms for routing within a mesh network that are also likely to be dependent on the operating conventions of the particular network. Further the memory includes data queues 433 or databases for storing data received from one WCU until it can be relayed or sent to a further WCU and a delay estimation algorithm 435 that is used to determine the probable delay if the normal course of action or normal antenna pattern is followed rather than interrupting that pattern.

Briefly the WCU operation includes the receiver 411 receiving a signal that is coupled thereto by the directional antenna system, where the signal has arrived from or been sent from a first selected one of a first plurality of directions, this plurality of directions being among those the directional antenna system of unit 400 can be directed or tuned to or that the antenna system scans. With a 6 sector antenna there should be as many as six different directions and the signal would arrive from a selected one of these. This is facilitated by the controller that is coupled to the transceiver, thus receiver, and the directional antenna system, and operates to control the directional antenna system such that the signal from the first selected one of the first plurality of directions is coupled to the receiver according too a local predetermined pattern 427 of the first plurality of directions. These patterns are such as those depicted by and discussed with reference to FIG. 2. Various processes for properly determining these predetermined patterns will be further reviewed below. This operation can facilitate a neighbor WCU contacting WCU 400 because it can know when WCU 400 will be receiving from or listening to the direction where it is located.

The WCU's transmitter is coupled to the controller and the directional antenna system and the controller is arranged to interrupt this local predetermined pattern of the first plurality of directions and cooperatively control the transmitter and the directional antenna to send a signal in a second selected one of the first plurality of directions. This facilitates the WCU 400 being able to contact another or target WCU for the purposes of sending information to that WCU which information may have been locally generated or provided or may have been queued up waiting to be relayed. Preferably, the local predetermined pattern will only be interrupted when the delay in waiting for the transmitter to see or point toward the target WCU at a time when the target WCU is listening or receiving from that direction is judged to be excessive by comparing a delay estimate from the routine 435 to some threshold, such as 5 seconds. By interrupting the local predetermined pattern of directions the WCU can avoid undue delay or latency that may result from continuing with the pattern until the transmitter, specifically antenna is pointing at the target WCU at a time when the target is listening. If the target WCU is using an omni-directional antenna the delay is likely to be inconsequential.

However, if the target WCU is operating according to a target predetermined pattern of a second plurality of directions this delay may be unacceptable or at least very annoying. In that case the second selected one of the first plurality of directions will, preferably, be selected or determined in accordance with a target predetermined pattern of a second plurality of directions. This is analogous to the discussions above with reference to FIG. 2 where the transmitter had to know when the receiver was listening from the appropriate direction in order to quickly reach the receiver. Note the target unit need not have the same 6 sector directional antenna system as the WCU 400 so the second selected one of the first plurality of directions is determined according to the plurality of directions that the target unit is working with. Basically the WCU can now operate as a wireless router n the mesh network.

As noted above the WCU or specifically memory 423 includes a database for storing one or more local predetermined patterns and one or more of target or peer or neighbor predetermined patterns, respectively, memory locations 427 and 429. There are various ways to determine each of these patterns. For example they may be preloaded in there respective databases at or prior to installation or upon initially bringing the WCU on line. For the local predetermined antenna patterns perhaps ten or so more or less random patterns that uniformly distribute dwell time over the entire antenna coverage area can be preloaded and when the unit is brought on line it randomly selects one of these for the local predetermined pattern. Presumably if problems developed the WCU on its own volition or when prompted by a user could attempt a different one of these patterns. Note that where different forms of antenna system are contemplated different forms of patterns would need to be preloaded, for example pattern for a six sector and three sector and steered beam antenna system may be required.

Additionally the WCU with service experience in the network or using statistics gathered during an initialization phase may select a particular predetermined pattern or fashion one on its own. For example there may be advantages if a WCU selects a pattern that is aligned in time with as many of its neighbors as possible. In this case neighbors would be "looking" at each other in the same time slot thus minimizing latency for communications between them. Of course if the neighbor WCU generates a lot of traffic in your direction most of which traffic is not for you or your WCU then it is likely to be beneficial to not be aligned with that neighbor in time. In the end you may attempt to select or form or develop a predetermined pattern that aligns with certain of those neighbors that generate significant traffic that is intended for your WCU for local use or consumption or for relaying to other destinations.

Regarding determining neighbor or target or peer predetermined patterns again these may be preloaded but that would likely be burdensome and subject to a lot of maintenance as new peers come on line. A preferred approach is to discover these target predetermined patterns by sending signals to and receiving signals from the targets. For example during an initialization phase the WCU can select and dwell or park on a particular antenna direction, periodically send out a "hello" or "whose there" message or a special RTS message, and listen for responses. The responses would preferably include a predetermined pattern or scanning pattern, where the unit is in the pattern, timing information, etc. The new WCU would stay on this direction until all neighbors or targets within range have responded or for a reasonable time period sufficient to allow all neighbors or targets with an opportunity to respond. The new WCU would then move to a new direction and repeat the process continuing until data had been collected from all directions. In the hello message or as a response to any response to a hello message the new WCU may send its local predetermined pattern. However it may be preferable to wait until all data is collected and then decide upon a local predetermined pattern and send information regarding this predetermined pattern to its neighbors. This would allow adjustments to the pattern to account for non uniform distribution of neighbors or likely traffic. For example if a disproportionate amount of traffic for a WCU is expected from a certain direction it may be advisable to select or develop a local predetermined pattern that spends a corresponding amount of time looking or listening in that direction.

Referring to FIG. 5 a simplified and representative form of another embodiment of a mesh communications system 500 according to the present invention is depicted. FIG. 5 shows that all subscriber units or WCUs do not need to have the same form of directional antenna system. WCUs A 501, B 503, and G 513 are shown with tri-sector directional antenna systems 502, 504, 514 that cover the entire horizon while WCU C 505 shows a tri-sector antenna 506 covering only half of the horizon. This can be a preferred approach to organizing a mesh system where units that are likely in high traffic areas or likely to be used routinely for relaying traffic or signals from other WCUs have more elaborate antenna systems and the others less elaborate and presumably less costly antenna systems. For example WCU D 507, E 509, F 111 are depicted with 6 sector antennas. These WCUs may well represent some form of backbone or major pathway for relaying messages and therefore more susceptible to being forced idle by RTS messages from the other units or at least the idle time would result in greater latency for greater numbers of messages than would be the case for some of the other units in this exemplary system. The inventive principles and concepts discussed above would apply equally to the system of FIG. 5. In this TDD system, additional slots may be defined within the sequence, which are not used in the pattern for scanning, but reserved for direct peer to peer communications between nodes. The allocation of these slots would be controlled by the transmission of information between nodes via the scanning and interruption process described herein.

Briefly we have shown and described a mesh communications system including a plurality of wireless communications units (WCUs). The system includes one or more originating or transmitting WCUs for transmitting a signal and one or more routing WCUs that include a receiver and a transmitter each coupled to a directional antenna system. The receiver and the directional antenna system are cooperatively controlled to receive the signal from a first selected one of a first plurality of directions, where the first selected one is determined according too a local predetermined pattern of the first plurality of directions. The transmitter and the directional antenna system are cooperatively controlled to send the signal in a second selected one of the first plurality of directions. Preferably, the second selected one of the plurality of directions is determined according too a direction of a target WCU relative to the routing WCU and further according too a target WCU's predetermined pattern of a second plurality of frequencies.

Typically the originating WCU will also include another directional antenna system and another transmitter that are cooperatively controlled to transmit the signal in a third selected one of a third plurality of directions where the third selected one is determined according to the local predetermined pattern of the first plurality of directions. This insures or facilitates the originating WCU transmitting the signal to the routing WCU at a time selected according to the local predetermined pattern such that the routing WCU will be receiving signals from the direction of the originating WCU. The directional antenna systems can take many forms including a steered beam antenna system an antenna system having a plurality of individual sectors.

The routing WCU and most other WCUs will store predetermined patterns of directions corresponding to target WCUs and thus predetermined pattern of directions corresponding to originating WCUs. These predetermined patterns may be preloaded at the various WCUs including the routing WCU however it is preferable that they be discovered at the routing WCU and others by communicating with the target WCU and the originating WCU.

Figure 6:
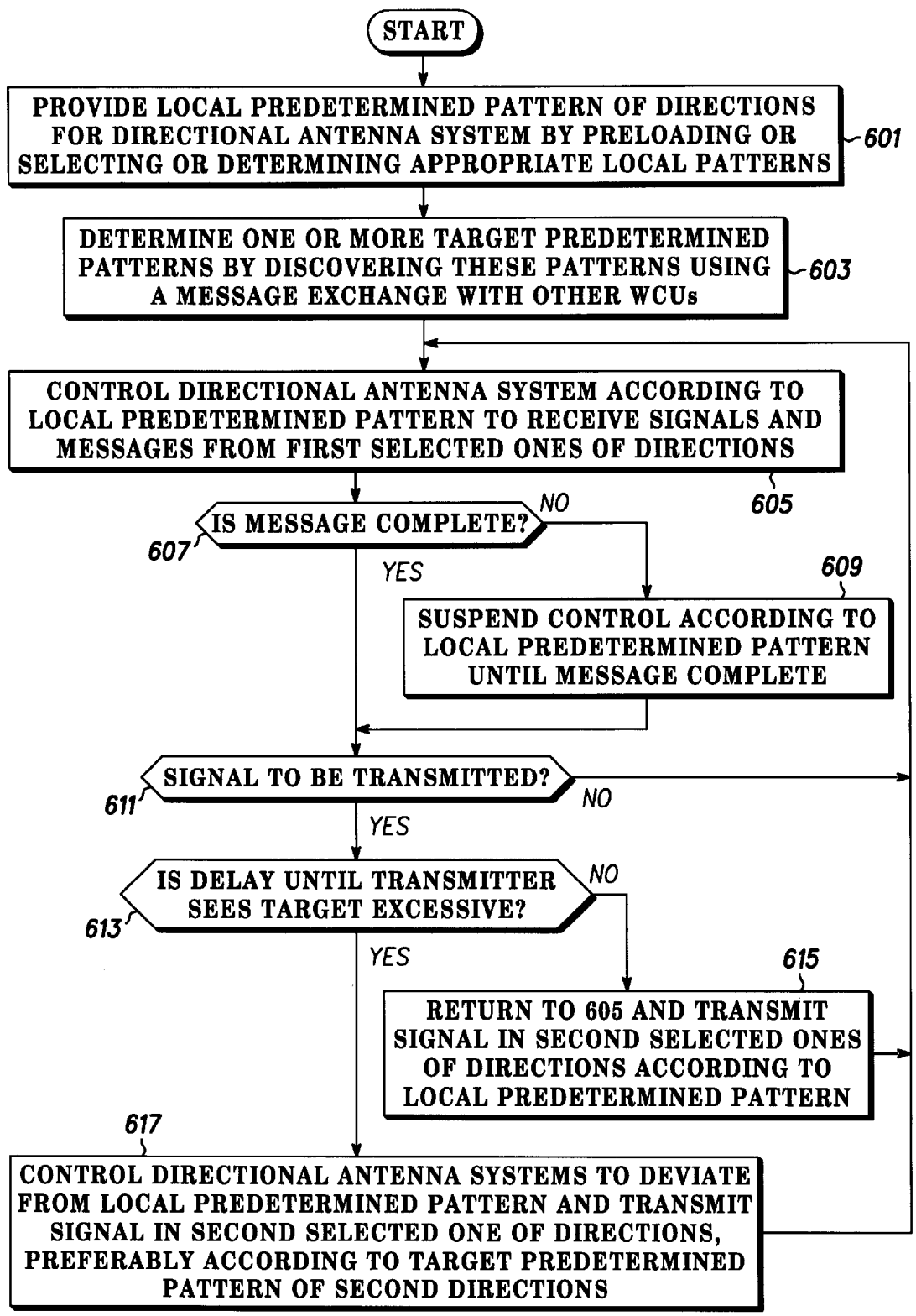
FIG. 6 shows a flow chart of a preferred method embodiment according to the present invention.

FIG. 6 shows a flow chart of a preferred method embodiment according to the present invention. A review of FIG. 6 will serve largely as a summary of certain of the basic processes, generally discussed above, that are occurring according to the principles and concepts of the present disclosure. The method 600, preferably occurs in a WCU and is method of providing services including routing services in a mesh network. The method 600 begins at 601 by providing a local predetermined pattern of first selected ones of a plurality of directions. Each of the plurality of directions may includes a heading and elevation component or coordinate. This local predetermined pattern is stored in the WCU and may be preloaded or selected from amongst a plurality of preloaded choices of patterns or may be determined in an initialization phase based on neighbor WCU distribution and likely traffic patterns as discussed above.

At 603 the method determines and stores within the WCU one or more target predetermined patterns. These can be preloaded but preferably they will be discovered using a message exchange with other WCUs. This exchange includes one or both transmitting to and receiving messages from the other WCU. They may be determined by simply monitoring the channel for a sufficient time to determine when a neighbor unit is listening or transmitting in the WCU direction At 605 controlling a directional antenna system according to the local predetermined pattern to selectively receive signals and messages therein from other WCUs in the mesh network, the signals arriving from the first selected ones of the plurality of directions occurs. Controlling the directional antenna system will depend on the type of antenna system and can include steering a beam antenna or stepping through a plurality of sectors for a multi-sector antenna. At 607 the method tests whether any message being received is completely received and if not 609 suspends control of the directional antenna system according to the local predetermined pattern until the message is complete.

After 609 and if the test at 607 is positive the method test whether there is a signal or message to be transmitted, basically whether any messages are in the WCU queue to be transmitted, and if not the method returns to 605 and if so moves to 613. At step 613 the delay until the transmitters sees or can reach the target WCU for the signal to be transmitted is tested to see whether it is excessive according to some predetermined threshold. If not 615 indicates that the method returns to 605 and transmits the signal in a second selected ones of the plurality of directions according to the local predetermined pattern. Note 613 is an optional step and if not utilized then step 615 would not be needed.

After 613 if present or 611 if 613 is not present, step 617 shows controlling the directional antenna system to deviate from the predetermined pattern to selectively transmit or send signals as determined at 611 in a second selected ones of said plurality of directions, namely in the direction of one or more other or target WCUs in the mesh network. Preferably the signals are transmitted or sent to a target WCU using the directional antenna now controlled in accordance with a target predetermined pattern of a second plurality of directions corresponding to the target WCU. Thereafter the method loops back to step 605 and resumes operating according to the local predetermined pattern.

The processes, discussed above, and the inventive principles thereof are intended to and will alleviate problems caused by prior art wireless mesh networks. Using these principles of predetermined patterns for tuning or controlling directional antennas as above described it is expected to minimize network traffic associated with failed attempts to establish links between peer communications units as well as minimize the number of units idled by a given communications exchange thus facilitating connectivity for today and tomorrows consumers.

Various embodiments of systems, methods, and apparatus for providing or facilitating the providing of services in a mesh network in an efficient and effective manner have been discussed and described. It is expected that these embodiments or others in accordance with the present invention will have application to many wireless local area networks that provide connectivity for their user or subscriber devices or units as well as such networks that are coupled to fixed or wired WANS such as the PSTN or internet. The disclosure extends to the constituent elements or equipment comprising such systems and specifically the methods employed thereby and therein. Using the inventive principles and concepts disclosed herein advantageously allows or provides for low latency and low network overhead access or links among communications units or devices and procedures for maintaining such access which will be beneficial to users and providers a like.

This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A wireless communications unit (WCU) arranged and constructed to provide service in a mesh network comprising in combination:

a receiver for receiving a signal from a first WCU in the mesh network;

a directional antenna system for coupling said signal to said receiver, said signal arriving from a first selected one of a first plurality of directions;

a controller, coupled to said receiver and said directional antenna system, to control said directional antenna system such that said signal from said first selected one of said first plurality of directions is coupled to said receiver according too a local predetennined pattern of said first plurality of directions; and a transmitter, coupled to said controller and said directional antenna system, said controller interrupting said local predetermined pattern of said first plurality of directions and cooperatively controlling said transmitter and said directional antenna to send a second signal in a second selected one of said first plurality of directions.

2. The WCU of claim 1 wherein said directional antenna system is a steered beam antenna system.

3. The WCU of claim 1 wherein said directional antenna system is an antenna system having a plurality of sectors.

4. The WCU of claim 3 wherein said plurality of sectors is six sectors.

5. The WCU of claim 1 wherein said first plurality of directions each include a heading and elevation component.

6. The WCU of claim 5 wherein said second selected one of said first plurality of directions is determined in accordance with a target predetermined pattern of a second plurality of directions.

7. The WCU of claim 6 wherein said controller further includes a database for storing said local predetermined pattern and one or more of said target predetermined patterns.

8. The WCU of claim 7 wherein said local predetermined pattern and said one or more of said target predetermined patterns are preloaded in said database.

9. The WCU of claim 7 wherein said one or more of said target predetermined patterns are discovered by one of sending signals to and receiving signals from other WCUs.

10. The WCU of claim 6 wherein said controller controls said transmitter and said receiver to operate as a wireless router in the mesh network.

11. In a wireless communications unit (WCU) a method of providing service in a mesh network including the steps of providing a local predetermined pattern of first selected ones of a plurality of directions;

controlling a directional antenna system according to said local predetermined pattern to selectively receive signals from other WCUs in the mesh network, said signals arriving from said first selected ones of said plurality of directions; and controlling said directional antenna system to deviate from said predetermined pattern to selectively transmit signals to other WCUs in the mesh network, said signals sent in second selected ones of said plurality of directions.

12. The method of claim 11 wherein said controlling a directional antenna system includes steering a beam antenna according to said local predetermined pattern.

13. The method of claim 11 wherein said controlling said directional antenna system includes stepping through a plurality of sectors of an antenna system according to said local predetermined pattern.

14. The method of claim 11 wherein each of said plurality of directions includes a heading and elevation component.

15. The method of claim 14 wherein said transmitting signals includes transmitting a signal to a target WCU using said directional antenna controlled in accordance with a target predetermined pattern of a second plurality of directions corresponding to said target WCU.

16. The method of claim 15 further including storing said local predetermined pattern and one or more of said target predetermined patterns at the WCU.

17. The method of claim 16 further including preloading the WCU with said local predetermined pattern and said one or more of said target predetermined patterns.

18. The method of claim 16 further including discovering said one or more of said target predetermined patterns by one of sending signals to and receiving signals from said other WCUs.

19. The method of claim 11 wherein said controlling said directional antenna system according to said predetermined pattern is suspended until a message corresponding to one of said receive signals is completely received.

20. A mesh communications system including a plurality of wireless communications units (WCUs) comprising in combination:

an originating WCU for transmitting a signal;

a routing WCU including a receiver and a transmitter each coupled to a directional antenna system, said receiver and said directional antenna system cooperatively controlled to receive said signal from a first selected one of a first plurality of directions, said first selected one determined according too a local predetermined pattern of said first plurality of directions, said transmitter and said directional antenna system cooperatively controlled to send said signal in a second selected one of said first plurality of directions.

21. The mesh communications system of claim 20 wherein said second selected one of said plurality of directions is determined according too a direction of a target WCU relative to said routing WCU.

22. The mesh communications system of claim 20 wherein said second selected one of said plurality of directions is determined according too a target WCU's predetermined pattern of a second plurality of directions.

23. The mesh communications system of claim 20 wherein said originating WCU further includes another directional antenna system and another transmitter that are cooperatively controlled to transmit said signal in a third selected one of a third plurality of directions, said third selected one determined according to said local predetermined pattern of said first plurality of directions.

24. The mesh communications system of claim 1 wherein said originating WCU transmits said signal to said routing WCU at a time selected according to said local predetermined pattern such that said routing WCU will be receiving signals from the direction of said originating WCU.

25. The mesh communcatiOns system of claim 20 wherein said directional antenna system is a steered beam antenna system.

26. The mesh communications system of claim 20 wherein said directional antenna system is an antenna system having a plurality of sectors.

27. The mesh communications system of claim 1 wherein said routing WCU stores a second predetermined pattern of directions corresponding to a target WCU and a third predetermined pattern of directions corresponding to said originating WCU.

28. The mesh communications system of claim 27 wherein said second and said third predetermined pattern of directions are preloaded at said routing WCU.

29. The mesh communications system of claim 27 wherein said second and said third predetermined pattern of directions are discovered at said routing WCU by communicating with said target WCU and said originating WCU.

* * * * *